US009151330B2

(12) United States Patent
Lessard

(10) Patent No.: US 9,151,330 B2
(45) Date of Patent: Oct. 6, 2015

(54) LINK MODULE, CORRESPONDING COUPLING AND METHOD

(71) Applicant: Compagnie Engrenages et Reducteurs-Messian-Durand, Cambrai (FR)

(72) Inventor: Fabrice Lessard, Cambrai (FR)

(73) Assignee: COMPAGNIE ENGRENAGES ET REDUCTEURS-MESSIAN-DURAND, Cambrai (FR)

( * ) Notice: Subject to any disclaimer, the term of this patent is extended or adjusted under 35 U.S.C. 154(b) by 67 days.

(21) Appl. No.: 13/930,934

(22) Filed: Jun. 28, 2013

(65) Prior Publication Data

US 2014/0010586 A1      Jan. 9, 2014

(30) Foreign Application Priority Data

Jul. 9, 2012   (FR) ...................... 12 56603

(51) Int. Cl.
*F16D 3/52*      (2006.01)
*F16D 1/04*      (2006.01)
*F16D 3/54*      (2006.01)

(52) U.S. Cl.
CPC .. *F16D 1/04* (2013.01); *F16D 3/52* (2013.01); *F16D 3/54* (2013.01); *F16D 2300/06* (2013.01); *F16D 2300/08* (2013.01); *Y10T 29/49826* (2015.01); *Y10T 403/26* (2015.01)

(58) Field of Classification Search
CPC ........................................................ F16D 3/52
USPC ................... 403/2, 40, 335; 464/54
See application file for complete search history.

(56) References Cited

U.S. PATENT DOCUMENTS

| 1,391,713 | A | * | 9/1921 | Bibby | 464/54 |
|---|---|---|---|---|---|
| 1,763,842 | A | * | 6/1930 | Bibby | 464/54 |
| 2,027,842 | A | * | 1/1936 | Schmitter et al. | 464/54 |
| 2,555,909 | A | | 6/1951 | Wellauer | |
| 2,643,529 | A | * | 6/1953 | Thomas | 464/54 |
| 2,885,871 | A | * | 5/1959 | Wellauer | 464/54 |
| 2,969,658 | A | * | 1/1961 | Wellauer | 464/54 |
| 3,013,410 | A | * | 12/1961 | Schmitter | 464/54 |
| 3,079,773 | A | * | 3/1963 | Schmitter et al. | 464/54 |
| 3,087,313 | A | | 4/1963 | Kerley, Jr. | |
| 3,096,631 | A | * | 7/1963 | Seireg et al. | 464/54 |
| 3,096,632 | A | * | 7/1963 | Wellauer et al. | 464/54 |
| 3,124,943 | A | * | 3/1964 | Schmitter | 464/54 |
| 3,196,635 | A | * | 7/1965 | Schmitter et al. | 464/54 |

(Continued)

FOREIGN PATENT DOCUMENTS

DE       666228      10/1938
FR       948404      8/1949

(Continued)

OTHER PUBLICATIONS

Search Report issued in French Application No. 1256603 (2012).

*Primary Examiner* — Daniel Wiley
(74) *Attorney, Agent, or Firm* — Young & Thompson

(57) ABSTRACT

A link module including a plurality of linking bars adapted to connect two coupling hubs, and grease suitable for lubricating the connection between the plurality of linking bars and the coupling hubs. The link module includes a package that is provided with an envelope surrounding the linking bars and the grease in a manner impervious to the grease, in particular in the absence of coupling hubs and/or a lid.

19 Claims, 5 Drawing Sheets

(56) References Cited

U.S. PATENT DOCUMENTS

| | | | |
|---|---|---|---|
| 4,044,572 A | * | 8/1977 | Wellauer et al. ............... 464/54 |
| 4,072,028 A | * | 2/1978 | Connell ......................... 464/54 |
| 4,413,980 A | * | 11/1983 | Walloch ........................ 464/82 |
| 4,881,921 A | * | 11/1989 | Pokrandt et al. ............... 464/54 |
| 4,925,431 A | * | 5/1990 | Pokrandt et al. ............... 464/54 |

FOREIGN PATENT DOCUMENTS

| | | |
|---|---|---|
| FR | 2913740 | 9/2008 |
| FR | 2913742 | 9/2008 |

* cited by examiner

LINK MODULE, CORRESPONDING COUPLING AND METHOD

This application claims priority to French patent application no. 1256603, filed Jul. 9, 2012. The disclosure set forth in the referenced application is incorporated herein by reference in its entirety.

The present invention relates to a link module, of the type comprising a plurality of linking bars adapted to connect two coupling hubs, grease suitable for lubricating the connection between the plurality of linking bars and the coupling hubs.

Couplings with metal springs are known comprising two hubs that are rotatably connected by spring elements.

The spring elements are inserted into recesses of the hubs. Grease is then applied on the spring elements and the hubs. A lid is positioned above the spring elements, the hubs and the grease and is fastened to the hubs.

This coupling has several drawbacks. Because the grease is applied after the spring elements and independently therefrom, the quantity of grease applied depends on the operator and is not defined. Also, the distribution of the grease is not defined and the quality of lubrication depends on the operator. Furthermore, the type of grease may be changed from the type of grease necessary and it is therefore possible to use an inappropriate type of grease.

Furthermore, the logistics and handling are complicated, given that the spring elements and the grease must be stored and ordered separately.

Lastly, the mounting and lubrication operation is time-consuming.

The invention aims to offset at least one of these drawbacks.

To that end, the invention relates to a module of the aforementioned type, characterized in that the link module comprises a package that is provided with an envelope surrounding the linking bars and the grease in a manner impervious to the grease, in particular in the absence of coupling hubs and/or a lid.

According to specific embodiments, the module comprises one or more of the following features:
- the envelope comprises a frangible wall that can be broken when the linking bars are placed on the coupling hubs;
- the link module has a general shape with a cylindrical cross-section, in particular semi-cylindrical, and the envelope comprises an outer wall and an inner wall, and in particular the inner wall being the frangible wall;
- at least one of the outer or inner walls includes recesses, each recess extending in a space between two adjacent linking bars;
- the package includes at least one end shell and one central shell, the end shell being more rigid than the envelope; and
- the linking bars are connected by linking portions, in particular bent linking portions, and in that the linking bars and the linking portions form a corrugated linking element, in particular a single-piece linking element.

The invention also relates to a coupling comprising two coupling hubs, characterized in that it comprises at least one link module as defined above, and in that the linking bars rotatably connect the coupling hubs.

The invention also relates to a method for manufacturing a coupling as defined above, comprising the following steps: simultaneously placing the linking bars on the coupling hubs and the grease between the linking bars and the coupling hubs.

According to specific embodiments, the method includes the following feature: a module as defined above, characterized in that, during placement, the frangible wall is broken.

The invention will be better understood upon reading the following description, which is provided solely as an example and done in reference to the appended drawings, in which:

FIG. 1 shows a coupling according to the invention, designated by general reference 2.

Figure 1:
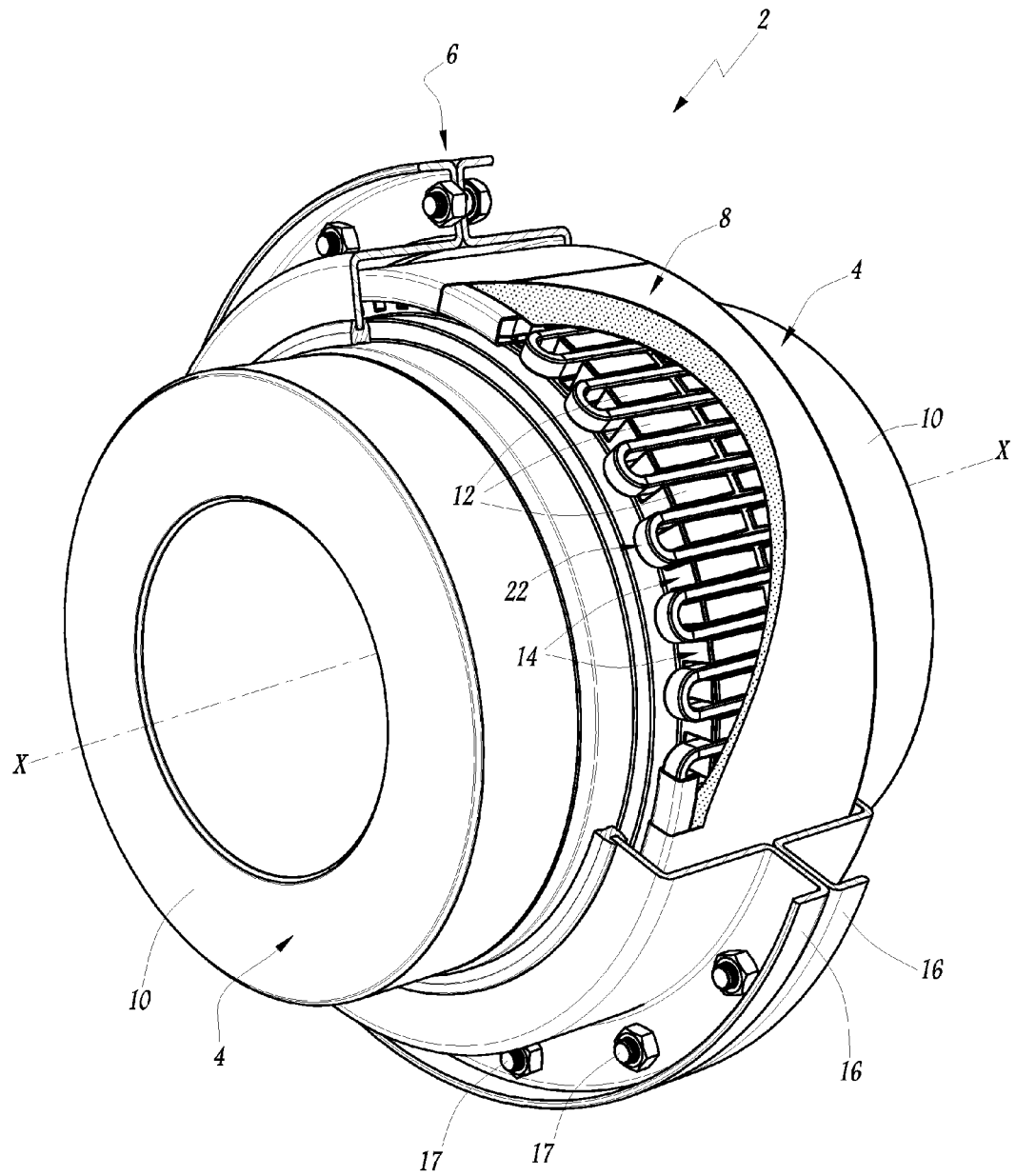
FIG. 1 is a perspective view with a partial cutaway of a coupling according to the invention.

The coupling 2 comprises two coupling hubs 4, 6, and two link modules 8. Hereafter, only one link module 8 will be described, the other being identical. The coupling 2 extends around a central axis X-X. The expressions "radially," "axially" and "circumferentially" will be used hereafter with respect to said central axis X-X.

Alternatively, the coupling 2 may include a single link module 8.

Each hub 4 includes a body with a cylindrical base 10 and projections 12. The projections 12 extend radially with respect to the axis X-X. Each projection 12 has a parallelepiped shape. Each projection 12 includes an axial end, which narrows in a direction extending axially toward the adjacent hub 4. Each time, two circumferentially adjacent hubs 12 define an interstice 14 between them.

The two hubs 4 are identical.

In the assembled state, the interstices 14 of the two hubs 4 are circumferentially aligned with one another.

The lid 6 includes two half-lids 16 surrounding the link module 8, the projections 12 and the interstices 14. The two half-lids press sealably on the two base bodies 10. The half-lids 16 are connected to each other by bolts 17.

In the case at hand, the two half-lids 16 have an annular shape and are separated by a separating plane extending perpendicular to the central axis X-X. Alternatively, the half-lids 16 have a semi-annular shape and are separated by a separating plane extending radially with respect to the central axis X-X.

The link module 8 comprises a plurality of linking bars 18. The linking bars 18 are fastened to each other by bent connecting portions 20, thus forming a corrugated linking element 22. The linking element 22 is preferably manufactured in a single piece, and in particular made from metal.

The linking bars 18 are rectilinear. The transverse cross-section of the linking bars 18 may be rectangular or trapezoidal.

The linking bars 18 are parallel to each other and extend, in the mounted state of the link module, parallel to the central axis X-X.

The link module 8 is also provided with grease 24 adapted to lubricate the link between the plurality of linking bars 18 and the coupling hubs 4. In the non-mounted state, the grease 24 extends each time between two adjacent linking bars 18.

The link module 8 also comprises a package 26 surrounding the linking element 22 and the grease 24, and in particular the linking bars 18. The package 26 is, in the state thereof not mounted on the hub, impervious to the grease. Consequently, the link module 8, in the absence of coupling hubs 4, may be manipulated in a single piece without the grease 24 escaping from the package 26.

The package 26 comprises a frangible wall that is adapted to break during placement of the linking bars 18, or the link module 8, on the coupling hubs 4. Furthermore, the frangible wall must be broken so as to place the linking bars 18 on the coupling hubs 4. The frangible wall is for example made from plastic.

Preferably, the frangible wall includes weakened portions, for example with a reduced thickness, forming breakage locations.

In the case at hand, the link module 8 is generally in the shape of a hollow cylinder on the axis X-X, more specifically a hollow semi-cylinder shape. In the case where the coupling 2 includes a single link module 8, the link module 8 assumes the general shape of a hollow cylinder that extends substantially around 360°.

The package 26 comprises an envelope 28 having an inner wall 30 and an outer wall 32. The inner wall 30 is in this case the frangible wall.

In the case at hand, the envelope 28, in the state thereof not mounted on the hub 4, is closed so as to be impervious to the grease and is for example a bag.

The envelope 28 is made from a plastic, such as a heat-shrinkable or vacuum-shrinkable plastic. Thus, the envelope 28 hugs the shape of the elements inside said envelope 28. The envelope 28 may consist of a film. Alternatively, the envelope 28 may be made up of materials other than plastic, for example a sealing coating, in particular paraffin wax.

At least one of the outer 30 or inner 32 walls includes recesses 34 each time extending in a space between two adjacent linking bars 18. These recesses 34 are capable of hugging the projections 12 during mounting and facilitate the positioning of the linking element 22 with respect to the hubs 4. The recesses 34 are advantageously formed by shrinking the envelope 28 during vacuum or heat application.

The package 26 also comprises two axial end shells 36, 38 and one axially central shell 40. The end shell 36, 38 is more rigid than the envelope 28. In the case at hand, each axial end shell 36, 38 is made up of a profile, in particular with a C-shaped radial cross-section, covering the linking portions 20. Each axial end shell 36, 38 is for example made from plastic or metal.

Each axial end shell 36, 38 and the associated bent linking portions 20 form grease reservoirs, receiving additional grease. Proper lubrication of the coupling is thus ensured.

The axially central shell 40 is a cylindrical sheet that is more rigid than the outer wall 32 of the envelope 28. The axially central shell 40 is made from plastic. The axially central shell 40 is pressed on the radially outer part of the linking bars 18. The shell 40 is for example made from sheet metal or plastic.

The axially central shell 40 helps distribute the striking forces on the linking element 22 during placement of the module 8 on the hubs 4. The outer wall 32 pressed on the axially central shell 40 is strong enough not to break under the forces necessary to mount the module 8 on the hubs 4, and in particular under mallet blows.

Alternatively, the axial end shells 36, 38 and/or the axially central shell 40 may be omitted.

The envelope 28 surrounds the linking element 22, the grease 24, the axial end shells 36, 38 and the axially central shell 40.

Figure 3:
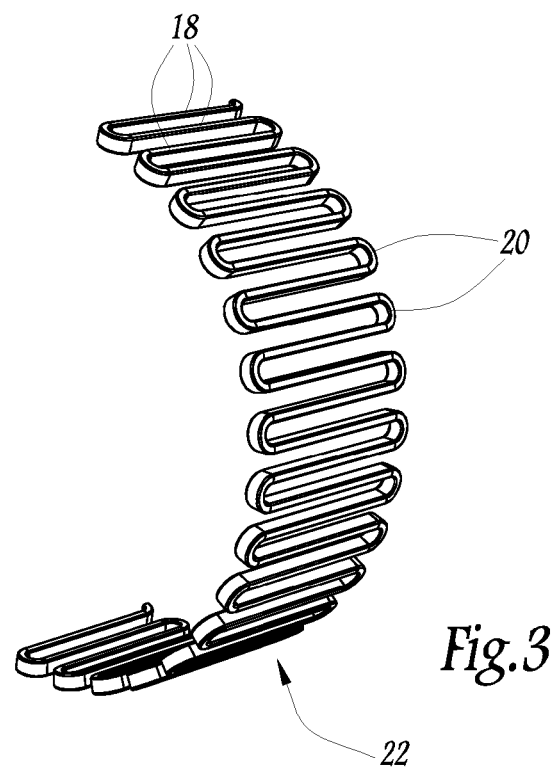
FIG. 3 is a perspective view of a corrugated linking element.

The link module 8 is manufactured as follows:

First, the corrugated linking element 22 is manufactured (see FIG. 3).

Figure 4:
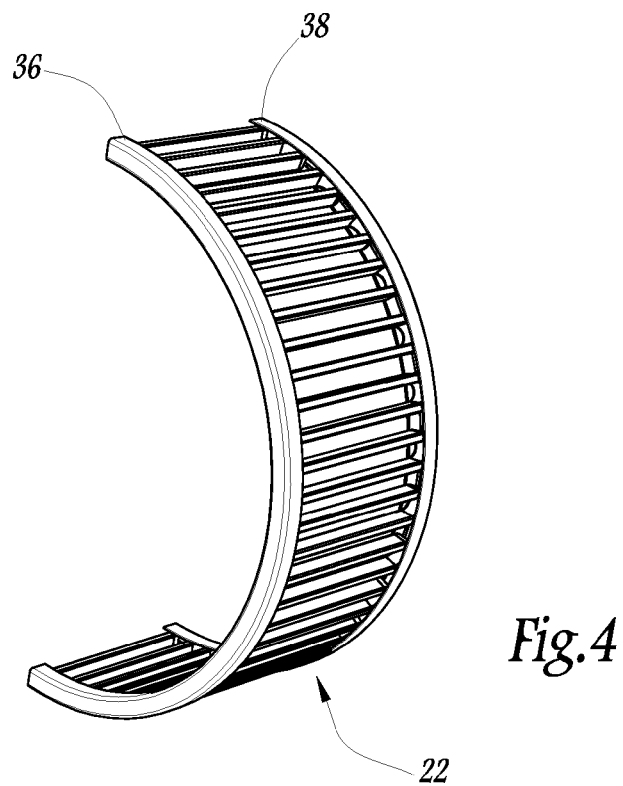
FIG. 4 is a perspective view of the corrugated linking element of FIG. 3 and the two axial end shells.

Then, the axial end shells 36, 38 are plugged on the linking portions 20 (see FIG. 4). The circumferential ends of the shells 36, 38 are aligned with the circumferential ends of the linking element 22.

Figure 5:
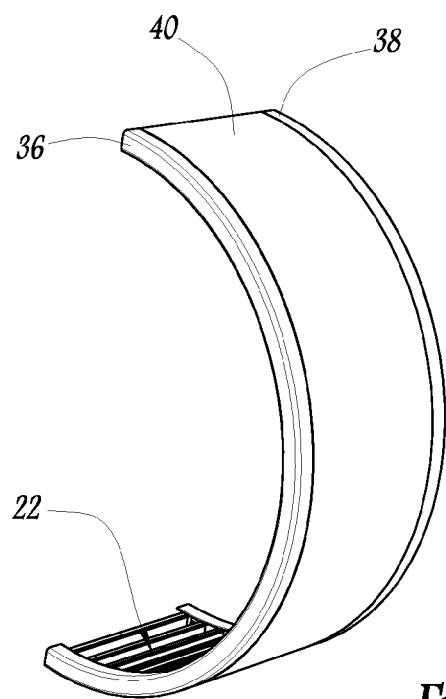
FIG. 5 is a perspective view of the corrugated linking element, two axial end shells and one axially central shell.
Figure 6:
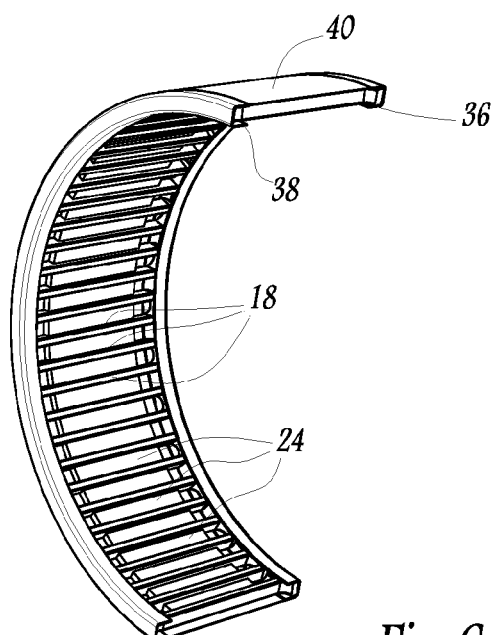
FIG. 6 is a view similar to that of FIG. 5, grease being inserted between the linking bars.
Figure 7:
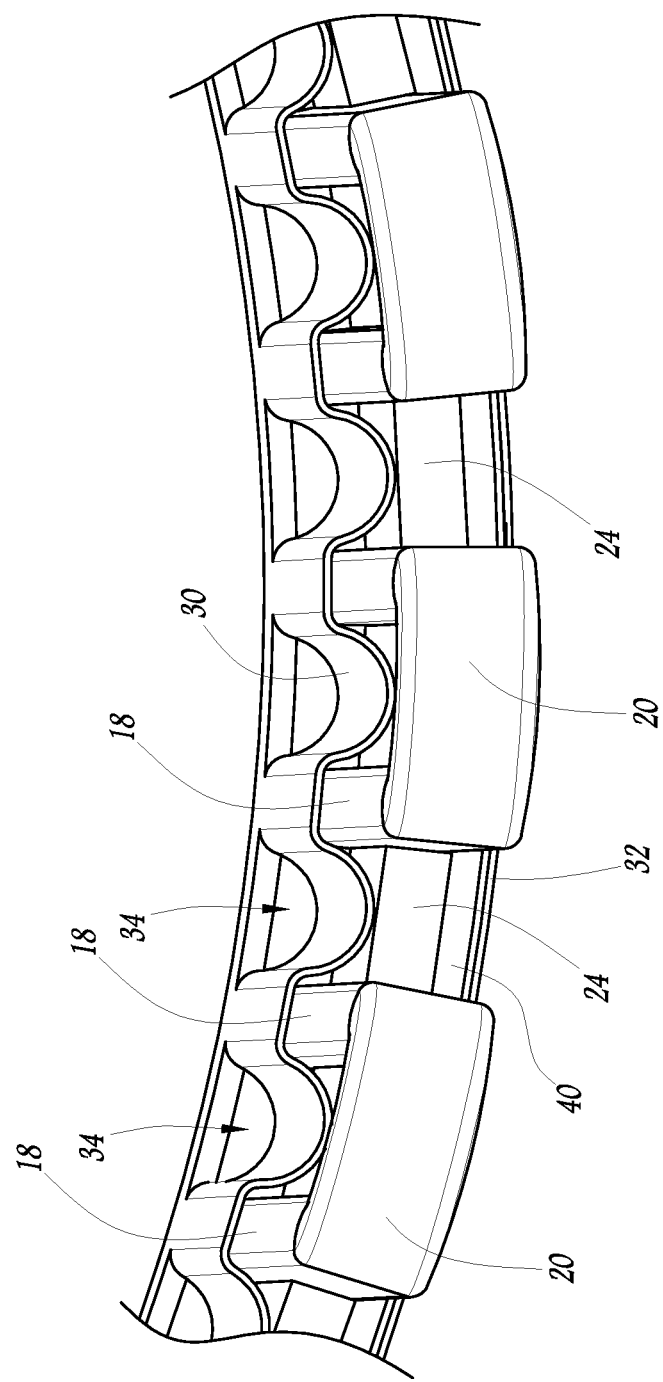
FIG. 7 is an enlarged side view of detail VII of FIG. 2.

Then, the axially central shell 40 is positioned between the shells 36, 38 and is circumferentially aligned with the circumferential ends of the shells 36, 38 and the linking element 22 (see FIG. 5).

Then, grease 24 is inserted into the interstice between two adjacent linking bars 18 each time. Next, the envelope 28 is positioned around the linking element 22, grease 24, axial end shells 36, 38 and axially central shell 40.

Next, the envelope 28 undergoes shrinking of its material, for example by applying heat or a vacuum.

Figure 2:
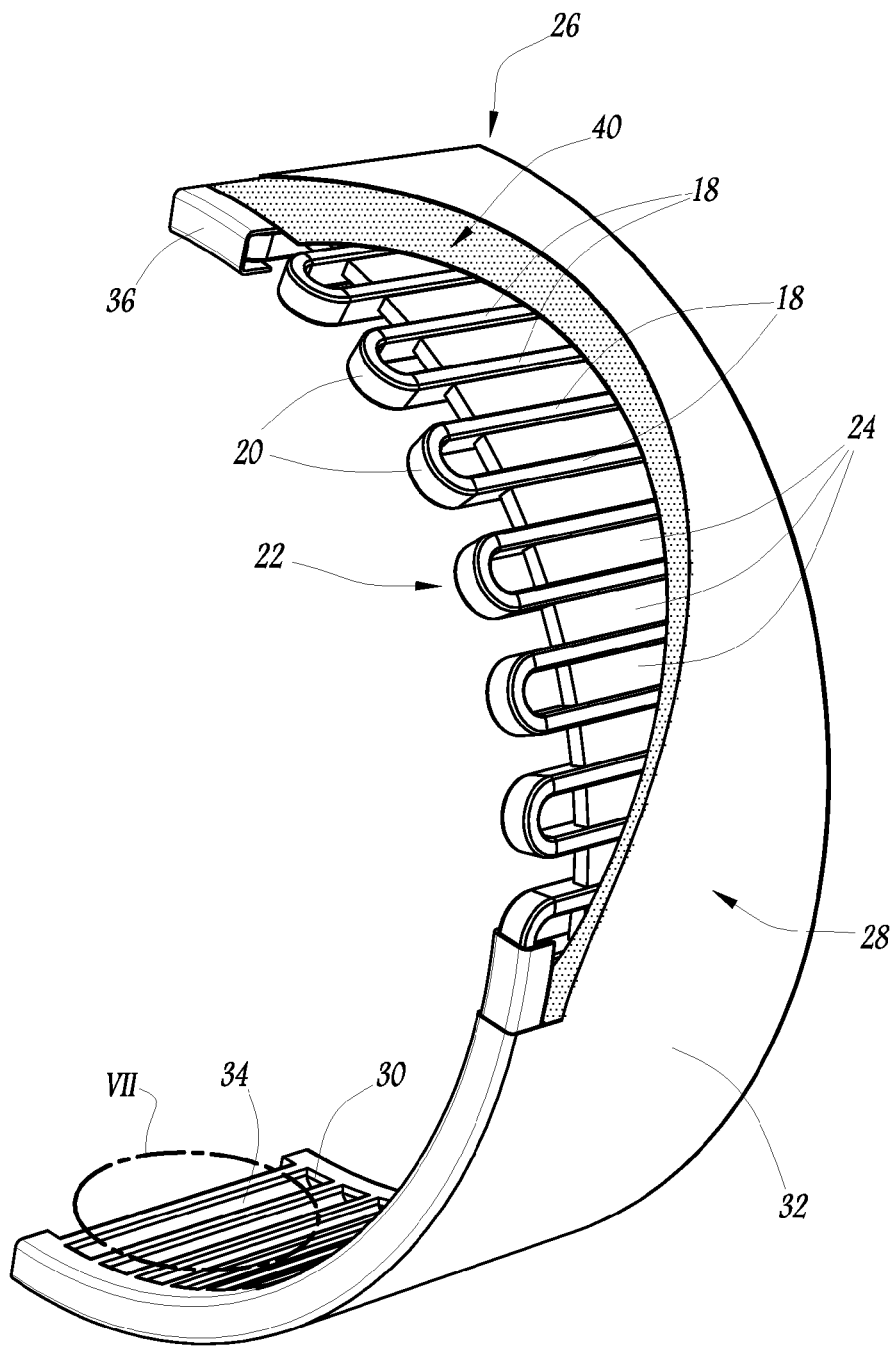
FIG. 2 is a perspective view of a link module according to the invention, with a partial cutaway.

Lastly, the link module 8 assumes the configuration shown in FIG. 2.

The coupling 2 of FIG. 1 is manufactured as follows, by using the link modules 8.

First, the two hubs 4 are manufactured and positioned such that the two hubs 4 are axially aligned and the interstices 14 are circumferentially aligned.

Next, in the present case, two link modules 8 are pressed on the projections 12 of the two hubs 4, such that the linking bars 18 are plugged into all of the interstices 14 of the two hubs 4.

During this positioning, the frangible wall is broken and the grease 24 is inserted into interstices 14 simultaneously with the linking bars 18.

Lastly, the lid 6 is placed above the link module 8.

The link module 8, the coupling 2 and its manufacturing method have the following advantages:

The user of the coupling must only procure and manage a single type of object, i.e., the link module 8, and not the linking element and the grease separately. Furthermore, the type of grease, the quality of the grease and the quantity of grease are predetermined and adapted to the operating needs of the coupling.

The placement of the link module 8 is clean and fast. In this respect, a step for cleaning the lubrication tool is omitted.

Secondarily, the package may also serve as a marketing holder or technical medium containing technical information.

The invention claimed is:

1. A link module for connecting two coupling hubs to form a coupling that extends longitudinally around a central axis, where each coupling hub comprises a body with a cylindrical base and a plurality of projections spaced circumferentially around the base, the link module comprising:
 a hollow, semi-cylindrical linking element, the linking element formed by a plurality of circumferentially spaced linking bars extending parallel to the central axis, wherein opposing ends of each linking bar are connected to adjacent linking bars by bent connecting portions, and wherein each of the linking bars is adapted to be received between aligned pairs of projections on the coupling hubs, in a mounted state of the link module,
 grease between each of the plurality of linking bars for lubricating a connection between the plurality of linking bars and the two coupling hubs, and
 an envelope surrounding the linking bars and the grease, wherein the envelope comprises a frangible inner wall that must be broken by pressing the linking element onto the projections to connect the linking bars to the coupling hubs, wherein the envelope, in a first state not mounted on the two coupling hubs, contains the grease within the envelope.

2. The link module according to claim 1, wherein the envelope comprises an outer wall and an inner wall, said inner wall being the frangible wall.

3. The link module according to claim 1, wherein the envelope is a bag.

4. The link module according to claim 1, wherein the envelope is made of plastic.

5. The link module according to claim 1, wherein the envelope is a sealing coating.

6. The link module according to claim 5, wherein the sealing coating is paraffin wax.

7. The link module of claim 1, wherein at least one of the inner wall and the outer wall comprise recesses that extend into a space between each pair of adjacent ones of the plurality of linking bars.

8. The link module of claim 1, wherein at least one of the inner wall and the outer wall comprise recesses that extend into a space between each pair of adjacent ones of the plurality of linking bars, the recesses being made of a material that shrinks during vacuum application.

9. The link module of claim 1, wherein at least one of the inner wall and the outer wall comprise recesses that extend into a space between each pair of adjacent ones of the plurality of linking bars, the recesses being made of a material that shrinks during heat application.

10. A link module for connecting two coupling hubs to form a coupling that extends longitudinally around a central axis, where each coupling hub comprises a body with a cylindrical base and a plurality of projections spaced circumferentially around the base, the link module comprising:
    a hollow, semi-cylindrical linking element, the linking element formed by a plurality of circumferentially spaced linking bars extending parallel to the central axis, wherein opposing ends of each of the linking bars are connected to adjacent linking bars by bent connecting portions, and wherein each of the linking bars is adapted to be received between aligned pairs of projections on the coupling hubs;
    grease extending between adjacent ones of the plurality of linking bars; and
    an envelope surrounding the linking bars and the grease, the envelope having
        a radially outer axial wall connected to
        a radially inner axial wall,
        the envelope, in an unmounted state of the link module, being a grease-tight envelope impervious to the grease such that the envelope contains the grease within the envelope,
    wherein the inside axial wall is a frangible wall that must be broken by pressing the linking element onto the projections to connect the linking bars to the coupling hubs and bring the link module into the mounted state.

11. The link module of claim 10, wherein the outer axial wall is connected to the inner axial wall by a pair of axial end shells in a grease-tight manner.

12. The link module of claim 11, further comprising a lid, and
    wherein, in the mounted state of the link module, the lid surrounds the outer axial wall and each of the axial end shells of the envelope, and sealably presses on the cylindrical base of each coupling hub.

13. The link module of claim 12, wherein at least one of the inner axial wall and the outer axial wall comprise recesses that extend into a space between each pair of the adjacent ones of the plurality of linking bars, the recesses being made of a material that shrinks during one of the group consisting of vacuum application and heat application.

14. The link module of claim 11, wherein at least one of the inner axial wall and the outer axial wall comprise recesses that extend into a space between each pair of the adjacent ones of the plurality of linking bars, the recesses being made of a material that shrinks during heat application.

15. The link module of claim 11, wherein at least one of the inner axial wall and the outer axial wall comprise recesses that extend into a space between each pair of the adjacent ones of the plurality of linking bars, the recesses being made of a material that shrinks during vacuum application.

16. The link module of claim 10, wherein the frangible wall is made of plastic.

17. The link module of claim 10, wherein the frangible wall has weakened portions of locally reduced thickness.

18. The link module of claim 10, wherein the frangible wall is made of a sealing coating.

19. The link module of claim 10, wherein the frangible wall is made of paraffin wax.

\* \* \* \* \*